United States Patent [19]

Klein et al.

[11] Patent Number: 5,415,297
[45] Date of Patent: May 16, 1995

[54] STORAGE RACK FOR OPTICAL DISC STORAGE CASES

[75] Inventors: Richard B. Klein; Chris Serslev, both of Overland Park, Kans.; Vijay S. Malik, Kansas City, Mo.

[73] Assignee: Lynk, Inc., Shawnee Mission, Kans.

[21] Appl. No.: 143,254

[22] Filed: Oct. 26, 1993

[51] Int. Cl.⁶ .............................................. A47F 5/00
[52] U.S. Cl. ...................................... 211/40; 108/61;
    211/43; 211/184; 211/194
[58] Field of Search ............... 211/41, 43, 194, 40,
    211/184; 108/61

[56] References Cited

U.S. PATENT DOCUMENTS

| | | |
|---|---|---|
| D. 85,502 | 11/1931 | Wilhelm . |
| D. 308,608 | 6/1990 | Arnold . |
| D. 341,500 | 11/1993 | Klein . |
| 790,669 | 5/1905 | Winship . |
| 873,496 | 12/1907 | Bryant . |
| 1,674,359 | 6/1928 | Frey .................... 211/43 X |
| 1,927,997 | 9/1933 | Weston . |
| 2,152,192 | 3/1939 | Hoffman . |
| 2,276,141 | 3/1942 | Atkinson . |
| 2,506,844 | 5/1950 | Smith . |
| 2,620,929 | 12/1952 | Sportsman ............. 211/43 X |
| 3,171,542 | 3/1965 | Jacobs et al. ............ 211/43 |
| 3,391,793 | 7/1968 | Streuli .................. 211/184 X |
| 3,468,426 | 9/1969 | Loewy . |
| 3,695,190 | 10/1972 | Bucholz . |
| 3,888,353 | 6/1975 | Leifheit . |
| 3,974,917 | 8/1976 | Waxmanski . |
| 3,999,734 | 12/1976 | Gibson et al. ......... 211/43 X |
| 4,245,746 | 1/1981 | Aylor ................... 211/40 |
| 4,673,092 | 6/1987 | Lamson et al. . |
| 4,819,814 | 4/1989 | Fogelgren . |
| 4,940,150 | 7/1990 | Spengler . |
| 5,035,332 | 7/1991 | Stravitz ................ 211/184 X |
| 5,082,125 | 1/1992 | Ninni .................... 108/61 X |
| 5,172,816 | 12/1992 | Klein et al. . |

*Primary Examiner*—Robert W. Gibson, Jr.
*Attorney, Agent, or Firm*—Kokjer, Kircher, Bowman & Johnson

[57] ABSTRACT

A modular storage rack for optical disc storage cases consisting of a plurality of rods extending between, and supported by, a pair of side frames. A slide abutment is removably connected to at least one of the rods for positionable sliding movement therealong, such that the abutment acts as a vertical support when less than the maximum number of cases is positioned upon the rack. Each side frame includes a groove arrangement in the top and a mating tongue arrangement at the bottom such that plural side frames may be stacked one upon the other in a stable manner. Each side frame also includes a tube support holes at each side thereof sized to receive an associated one of the rods. As such, the rods may be inserted within the receiving holes of two side frames to define a rack of single unit length. Thereafter, an additional pair of rods may be inserted into the receiving holes on an opposite side of one of the previous side frames, and a third side frame connected to the free ends of these additional rods. With this arrangement, a rack having two units length is provided by using only three side frames.

5 Claims, 1 Drawing Sheet

STORAGE RACK FOR OPTICAL DISC STORAGE CASES

BACKGROUND OF THE INVENTION

1. Field of the Invention

The present invention relates in general to racks for storing rectangular items. In particular, the present invention relates to an improved rack for storing compact disc cases, such rack having a modular nature for expansion of storage capacity.

2. Description of the Related Art

Numerous arrangements for the storage of rectangular items such as books, albums and videocassette cases have been known for many years. Such arrangements have included a horizontal base member with vertical sidewalls against which the items may rest, such as a self with bookends. Other arrangements have included modular racks including vertical side members supporting base, and sometimes rear wall members, with the items, such as videocassette cases, supported upon the base member and rear wall, with one of the stored cases abutting against one of the side members and the remaining cases abutting against an adjacent stored case.

In recent years optical storage media such as compact and video discs have gained widespread popularity due to increased storage capacity and decreased data corruption compared to other available storage media. Such discs are typically stored in cases having a generally rectangular form, with length and depth dimensions slightly larger than that of the associated disc, and a thickness slightly larger than the thickness of the disc. However, since the discs are relatively thin, the thickness of these cases is disproportionately small compared to the length and depth. This results in the cases being statically unsteady when attempted to be stored in an upright position resting upon the thickness dimension.

To overcome this problem, it has been known to provide storage units for such optical media consisting of a plurality of vertically stacked shelves, with each shelf sized to receive a storage case resting upon the length and width dimension faces, in a much more statically stable configuration. While such storage arrangements are serviceable, they require a large amount of space compared to the volume actually occupied by the storage cases, and are thus inefficient. While bookend arrangements are also employed for such cases, the ease of movement of the bookends combined with the instability of the cases when stored in the upright position combine to often result in falling of the cases, especially the remaining cases when one or more cases is removed from the storage position.

SUMMARY OF THE INVENTION

An object of the present invention is to provide a storage rack for storage cases which will efficiently store such cases.

Another object of the present invention is to provide such a storage rack which will reliably maintain the cases in an upright position.

Another object of the present invention is to provide such a storage rack which is readily adjustable to reliably hold such cases even when less than the maximum amount of cases are positioned within the rack.

Another object of the present invention is to provide such a storage rack which includes an adjustable abutment arm which will support the cases within the rack.

Another object of the present invention is to provide a space saving storage rack for optical disc storage cases which is modular with interlocking features such that multiple racks may be stacked one upon another.

Yet another object of the present invention is to provide such storage racks as in which additional modular elements may be added to increase the length of the rack with minimal use of materials, and with improved stability of the rack.

These and other objects are achieved by a modular storage rack for optical disc storage cases consisting of a plurality of rods extending between, and supported by, a pair of side frames. The side frames are generally rectangular in configuration and are identical in construction. A slide abutment is removably connected to at least one of the rods for positionable sliding movement therealong, such that the abutment acts as a vertical support when less than the maximum number of cases is positioned upon the rack. Each side frame includes a groove arrangement in the top and a mating tongue arrangement at the bottom such that plural side frames may be stacked one upon the other in a stable manner. Each side frame also includes a receiving holes at each side thereof sized to receive an associated one of the rods. As such, the rods may be inserted within the receiving holes of two side frames to define a rack of single unit length. Thereafter, an additional pair of rods may be inserted into the receiving holes on an opposite side of one of the previous side frames, and a third side frame connected to the free ends of these additional rods. With this arrangement, a rack having two units length is provided by using only three side frames, thus saving the material employed to form a fourth side frame, which would be required using prior art devices. The elongated structure is also formed as a single unit which is more structurally sound and aesthetically pleasing than a pair of prior art devices.

BRIEF DESCRIPTION OF THE DRAWINGS

The objects and features of the invention noted above are explained in more detail with reference to the drawings in which like reference numerals denote like elements, and in which.

DETAILED DESCRIPTION OF THE INVENTION

Figure 1:
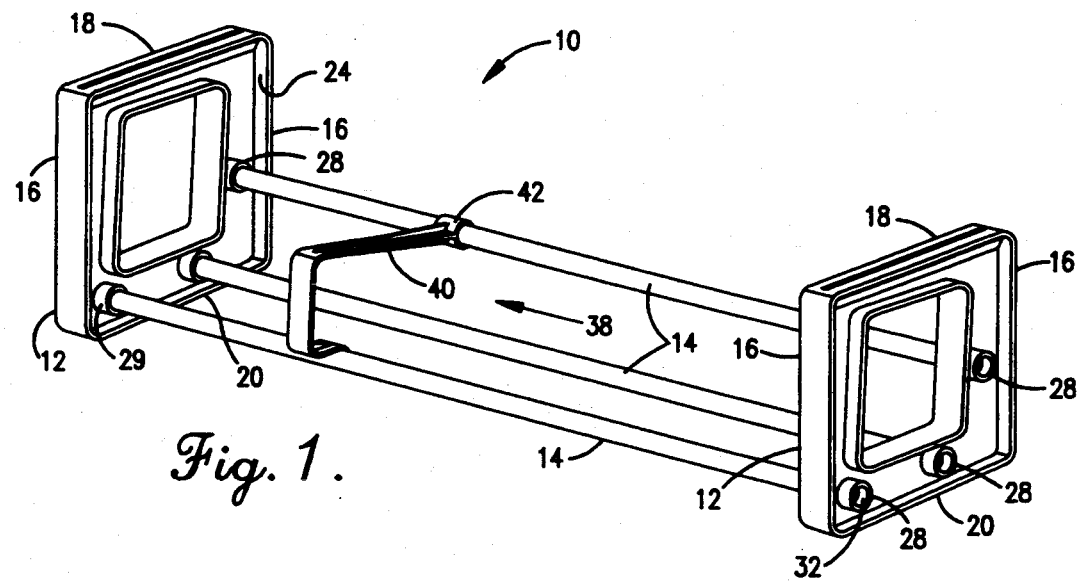
FIG. 1 is a perspective view of a storage rack according to the present invention.

With reference to FIG. 1, a single unit storage rack according to the present invention is generally designated by reference numeral 10. Each single unit 10 generally consists of a pair of side frames 12 which support a plurality of support tubes 14.

Each of the side frames 12 is substantially identical and has a generally rectangular configuration. Specifically, each side frame 12 includes a pair of spaced upwardly extending struts 16 which are maintained in position by an upper cross bar 18 connected to and extending between each strut 16 at a position adjacent to the upper ends of the struts and a lower cross bar 20 connected to and extending between the struts 16 at a position adjacent to the lower ends of the struts.

The struts 16 and cross bars 18 and 20 may be formed of separate elements which are connected together by adhesives, welding or other known means. However, it is preferred for strength and economy that these elements be formed as monolithic units by plastic molding. Where such plastic material is employed, it may be necessary to form an outwardly extending reinforcing rib 24 which extends along each of the members 16 through 20 to encompass the entire outer periphery of the rectangular shape of the side frame 12.

The side frames each include a number of tube supports 28, this number corresponding to the anticipated number of support tubes 14. While the tube supports may take many cross-sectional configurations, in the present invention it is preferred that the supports 28 take the form of cylindrical holes in the side frames which have a diameter sized to frictionally retain the support tubes 14 therein. These holes have a sufficient depth to reliably retain an associated end of an associated support tube therein. This depth may require forming the hole by a peripheral flange 29 extending outwardly from the side frame, should the side frame have a small thickness.

Figure 3:
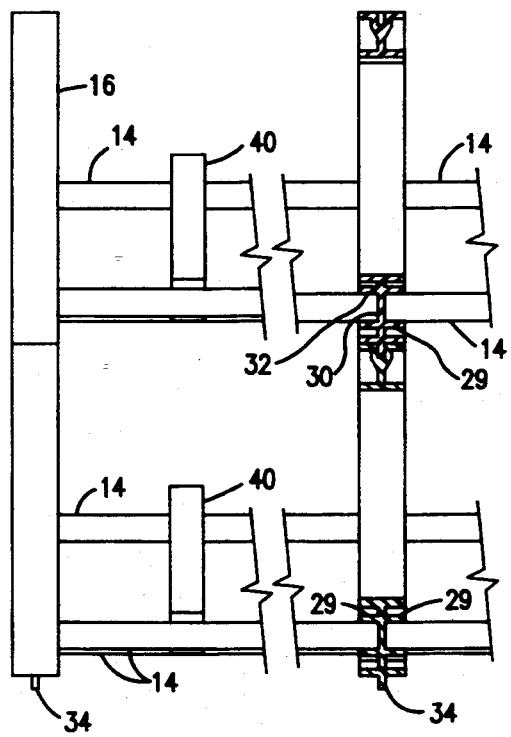
FIG. 3 is a front view in partial cross-section showing the modular nature of the present rack.

As is best shown in FIG. 3, each of the cylindrical holes which define the tube supports 28 includes a centrally located dividing wall 30. As such, each of the tube supports 28 on each side frame include and define a pair of cylindrical cavities 32 which each open outwardly from the plane defined by the associated strut 16 and cross bars 18 and 20, with the cavity 32 being formed by the dividing wall 30 and the flange 49 in the embodiment shown. These cavities 32 will receive the ends of the support tubes 14, with the end of the support tube abutting the dividing wall 30, as best shown in FIG. 3. This abutment will allow the user to readily place the tubes in the cavities to the proper depth.

The support tubes 14 which extend between the side frames 12 are preferably formed of steel, aluminum, or other metal sheeting rolled into a tubular form. This will provide sufficient strength to support optical disc storage cases (although the rack according to the invention will of course support a wide variety of items). Other materials besides metal could of course be employed if they have the necessary strength.

Each of the side frames 14 will include a plurality of tube supports, such that a plurality of support tubes will extend between each adjacent pair of side frames. The number and arrangement of tube supports could, of course vary.

For example, two tube supports could be employed in spaced relation on each lower cross bar 20. This would result in two spaced (in a radial direction from the tubes) support tubes, in a manner similar to shown in the figures. These could then support a single edge of a rectangular storage case, or the case could extend slightly between the tube to be supported by two adjacent edges. In a similar manner a circular storage case could be supported on its circular periphery with a portion of the case extending between the tubes.

This latter arrangement with the container extending partially between the tubes may also be employed with one tube support being arranged on each of the lower crossbar 20 and one of the struts 16. This arrangement would provide support in the vertical direction and in the horizontal direction.

Figure 2:
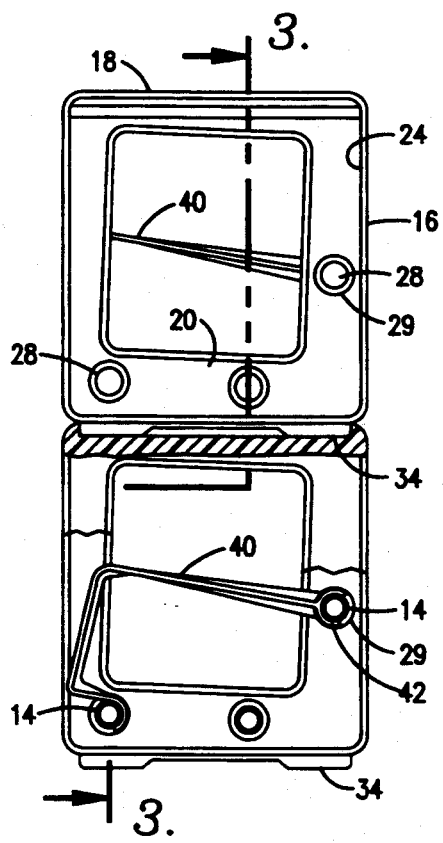
FIG. 2 is a side view of stacked side frames according to the present invention.

The preferred arrangement of two tube supports on the lower crossbar and one tube support on one of the struts is shown in the figures. With this arrangement the storage cases are securely supported in the vertical and horizontal directions, and against tipping in the plane of the side frame, yet use a minimum of support tubes. As is best shown in FIGS. 2 and 3, it is also preferred that the crossbar tube support furthest from the strut tube support be slightly vertically higher than the other crossbar tube support. This will tend to cradle the storage case and reduce accidental movement of the case from the rack.

Arrangements of tube supports other than those discussed above are of course available. For example, both struts could be provided with tube supports to fully cradle the cases.

For additional storage capacity in a lateral direction, an additional pair of support tubes 14 may be inserted into the outwardly opening cylindrical cavities 32 of one of the side frames 12. A third side frame would then be mounted to the free end of these additional support tubes to define a support rack which is two units long. It should be noted, and is an important aspect of the present invention, that while such a support rack would be two units long, only three of the side frames 12 need be employed. This will save materials and thus cost for the user. Additionally, the extended rack will be a single integral unit having greater structural stability and aesthetic appeal than simply two single units placed side by side.

It is to be understood that additional support tubes 14 could be inserted into the outwardly opening cavities 32 of this third side frame, or the other of the original side frames, and a further side frame 12 attached thereto to further enlarge the lateral length of the support rack, with there being no limit to such lateral extension. In general terms, for each unit length n, the number of side frames necessary will be n+1, rather than 2n for multiple discrete prior art units, thus saving greater amounts of material with greater length.

The side frames according to the present invention are also provided with interlocking structure such that the racks may be stacked one upon the other in a stable manner to provide further storage capacity.

In particular, the lower cross bar 20 includes a centrally located and downward extending interlock rib 34. Rib 34 extends substantially the full length of the cross bar 20 as shown in the accompanying figures. Alternatively, the interlock rib 34 may be formed as a plurality of members having lesser length, such as a pair of ribs spaced along the length of the cross bar.

Extending into the upper cross bar 18 is a guide cavity 36. The cavity 36 is substantially centrally located and sized so as to receive the interlock rib 34 of a side frame 12 stacked upon it. In this manner a stable interlock arrangement is provided such that side frames 12 of units 10 may be stacked one upon the other. Specifically, the arrangement of the interlock rib 34 and guide cavity 36 will prevent movement of the side frames in a lateral direction and in a front to rear direction. This will substantially eliminate the possibility of accidental displacement of the stacked side frames, with this interlocking arrangement being enhanced by the placement of storage cases upon the upper one of the units 10.

From the above description it may be seen that the modular support rack according to the present invention provides utility to the user. As a single unit the rack provides stable storage for items. Additionally, the rack may be expanded laterally in a manner which is structurally sound, reduces material costs and saves space. Further, the arrangement provides for vertical expansion in a stable manner, providing yet more storage capacity.

Additional variations may be made to the present invention to make it more useful. One such variation allows use of the standard components to allow the storage of oversized cases. The typical stacked configuration of the present units described above will have sufficient height between vertically adjacent rods for the storage of compact disc cases, but not for video cassette cases. The video cassette cases could of course be stored on the upper one of the units 10, but this will reduce the amount of such storage available. While the length of the struts could be increased such that video cassette cases will fit between stacked units, this would result in wasted space and material when the units are employed for compact disc cases.

To allow the storage of video cassette cases in a protected manner without wasting space or material, a pair of side frames without the usual support tubes could be placed within a stack of the units to provide the necessary space. For example, two units 10 could be stacked with one unit upon the other. A pair of side frame without the support tubes extending therebetween could then be placed on the second or upper unit 10. One or more additional units 10 would then be stacked upon the unattached side frames to complete the desired stack of units.

By this arrangement the unattached side frames will act as spacers, creating twice the usual vertical spacing between the vertically adjacent support tube pairs which border the unattached side frames. This extra spacing between the support tube pairs provides sufficient space for videocassette cases or other tall items to be stored upon the lower of these pair, while the usual spacing between the remaining support tube pairs will allow the storage of compact disc cases or vertically short items without wasted space or material.

While the particular location (i.e., bottom, next to bottom, etc.) of the unit 10 supporting the unattached side frames is not important, it is preferred that at least one unit 10 be mounted upon the unattached side frames. This is due to the reduced stability of the unattached side frames compared to a complete unit 10, which is aggravated when the side frames are formed of a light weight plastic. Stacking a unit 10 upon the unattached side frames lends lateral and front to back stability to the upper ends of the unattached side frames, and the added weight helps to maintain the interlocking means in position.

The unattached side frames may be provided with further stability if one or more of these side frames includes a lateral extension as discussed above. For example, a modular rack may be formed with a lower level being three units long in the lateral direction (four side frames separated by three support tube pairs). The next level could then be formed using two units 10 each having a single unit length, and stacked upon the lower level with one side frame of each unit 10 interlocking with a laterally exterior one of the side frames of the lower level. This will result in the two interior side frames of the upper or second level being unattached to each other, thus providing a sheltered space for storing video cassette cases. Of course, additional levels could be placed upon the second level for additional storage capacity. These additional levels would further stabilize the unattached side frames, although this is not believed to be necessary.

As noted above, when thin items such as compact disc cases are stored by resting upon this thin edge, there is a tendency for the item to be statically unstable. Such storage on the thin dimension is, however, the preferred arrangement in the present invention. To reduce this static instability, the present invention is provided with a slide abutment, generally designated by reference numeral 38 in FIG. 1.

The slide abutment 38 takes the general form of a bar extending between two of the support tubes in a plane substantially parallel to the side frames to form an abutment against which the adjacent (and endmost) item may rest. This may require that this general form of a bar have a circuitous path, such as a U shape, for example where only two support tubes are provided on the lower crossbar. In the embodiment shown, the abutment 38 has a general inverted L shaped body 40 and extends between the tube connected to the strut and the tube on the cross bar farthest from such tube on the strut. Other configurations may be employed, but it is generally preferred that the abutment 38 pass generally near the center of mass of the item to provide optimum support.

The slide abutment 38 is mounted for sliding movement on the support tubes along their longitudinal axes. This will allow the abutment to be placed in close proximity to the endmost item, regardless of its position. To function effectively as an abutment, however, the abutment 38 must also be relatively or selectively immobile on the support tubes.

This ability to be fixed yet movable could be effected by appropriate locking arrangements involving cams which engage the slide rods, as are commercially known. However, to reduce cost it is preferred to connect the abutment to at least one of the rods using a relatively tight snap fit, such that the snap fit is immobile against forces generated solely by the item(s), but is freely movable upon application of manual pressure.

As such, a first end of the abutment 38 is provided with a snap claw 42 formed of a somewhat resilient material such a plastic having a partial circumference sized to provide a tight surrounding fit about the slide tube. As is known, the snap claw will have a partial circumference of greater than 180° to maintain it in position, but less than 360° to allow it to be removed or added as desired.

The other end of the body 40 may also include a similar snap claw. However, this will typically require the use of two hands, one on each snap claw, to move the abutment without binding, due to the resistance of the snap claws to movement. To allow one-handed movement it is preferred that the other end of the body be secured to the associated support tube with a much lesser force. This may be effected by providing the second end of the body with an inverted U hook extending partially about the periphery of the associated support tube, as best shown in FIG. 2.

While various configurations for the body 40 are available, where it is formed of plastic it is preferred that there be provided appropriate reinforcement ribbing thereon, as shown in the drawings.

While the present invention has been described with reference to a specific embodiment, it should be noted that various modifications may be made without departing from the spirit of the invention. For example, different materials or reinforcement rib arrangements may be employed.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A modular storage rack system, comprising:
   at least one pair of support tubes; and
   at least two side frames, each including a pair of tube supports, each of said tube supports retaining an associated one of said support tubes such that said support tubes extend between said side frames with said side frames being substantially parallel; and
   a slide abutment extending between, and connected to, two of said support tubes in a plane substantially parallel to said side frames, said slide abutment having a close sliding fit with at least one of said support tubes whereby said slide abutment may be manually moved along the longitudinal axis of said support tubes, but does not move upon application of forces solely by items stored upon said rack and abutting said slide abutment, said slide abutment having a generally L-shaped body, with a first end of said body including a snap claw mounted thereon and connected to an associated one of said support tubes to provide said close sliding fit, said snap claw being removable from said associated support tube.

2. A rack as in claim 1, wherein said body includes a U-shaped hook extending about a portion of the periphery of an associated one of said support tubes.

3. A rack as in claim 1, wherein each of said side frames includes a plurality of pairs of oppositely opening cavities, each of which is adapted to receive a respective end of one of said tubes, with a pair of said tubes extending between each adjacent pair of said frames, said tube supports being located above a lower end of said side frames whereby said support tubes are supported above the ground, and whereby one pair of said tubes may be connected to and extend between one pair of said side frames to define a single unit length rack having exterior ones of said frames, and an additional pair of said tubes may be connected to and extend between the open ones of said cavities of said exterior ones of said frames and an additional side frame to define a multiple unit rack having n units with the use of only n+1 side frames.

4. A system as in claim 1, wherein each of said side frames includes a pair of spaced substantially vertically extending struts and un upper and a lower crossbar extending between and connected to said struts to define a generally rectangular configuration.

5. A system as in claim 4, wherein each of said side frames is formed as a monolithic unit.

* * * * *